United States Patent [19]

Loock et al.

[11] Patent Number: 4,946,312
[45] Date of Patent: Aug. 7, 1990

[54] APPARATUS FOR OPENING UP GARBAGE DUMPING GROUND GAS SOURCES AND FOR THE EXPLORATION AND SANIFICATION OF OLD DEPOSIT SITE BURDENS AND CONTAMINATED SOILS

[75] Inventors: Rudolf Loock; Claus Jebens, both of Hamburg, Fed. Rep. of Germany

[73] Assignee: Holsteiner Gas-Gesellschaft mbH, Hamburg, Fed. Rep. of Germany

[21] Appl. No.: 273,819
[22] PCT Filed: Feb. 12, 1988
[86] PCT No.: PCT/DE88/00066
  § 371 Date: Oct. 7, 1988
  § 102(e) Date: Oct. 7, 1988
[87] PCT Pub. No.: WO88/06209
  PCT Pub. Date: Aug. 25, 1988

[30] Foreign Application Priority Data
  Feb. 13, 1987 [DE] Fed. Rep. of Germany ....... 3704481

[51] Int. Cl.$^5$ ............................................. E21B 45/00
[52] U.S. Cl. ..................................... 405/129; 166/369
[58] Field of Search ............... 405/128, 129, 253, 254, 405/242; 166/242, 369; 175/393, 401, 402

[56] References Cited
U.S. PATENT DOCUMENTS

| 3,333,430 | 8/1967 | Dougherty | 405/253 |
| 3,881,320 | 5/1975 | Gendron | 405/242 |
| 3,925,998 | 12/1975 | LeCorgne | 405/242 |
| 4,026,355 | 5/1977 | Johnson et al. | 166/246 |
| 4,262,747 | 4/1981 | Elliott et al. | 405/128 X |
| 4,469,176 | 9/1984 | Zison et al. | 405/129 X |
| 4,483,396 | 11/1984 | Kennelly | 166/242 |
| 4,518,399 | 5/1985 | Croskell et al. | 405/129 X |

FOREIGN PATENT DOCUMENTS

| 7521128 | 11/1975 | Fed. Rep. of Germany . |
| 2619431 | 11/1977 | Fed. Rep. of Germany . |
| 2655541 | 6/1978 | Fed. Rep. of Germany . |
| 2949938 | 6/1981 | Fed. Rep. of Germany . |
| 3131100 | 2/1983 | Fed. Rep. of Germany . |
| 2945554 | 5/1986 | Fed. Rep. of Germany . |

OTHER PUBLICATIONS

Swiss Journal, "Gas-Wasser-Abwasser", No. 10, 1984, pp. 651–655.
German Journal, "Mull und Abfall", 1/1982, pp. 16–20.

Primary Examiner—Dennis L. Taylor
Assistant Examiner—John A. Ricci
Attorney, Agent, or Firm—Antonelli, Terry, Stout & Kraus

[57] ABSTRACT

An apparatus for the opening up of garbage dumping ground gas sources and for the exploration and sanitization of old deposit site burdens and contaminated soils. A hollow cylindrical probe is insertable into the gassy zone of the dump and is provided with wall perforations, serving as gas inlet apertures, as well as with a gas evacuation duct. The apparatus possesses a rigid probe body permitting it to be pile-driven into the dump or soil surface. The body includes a hollow cylindrical steel container, the casing wall of which is provided with the wall perforations and the diameter of which is larger than that of a gas evacuation duct coaxially and detachably connected therewith the apparatus is insertable with as little disturbance as possible of the dump material. At the same time, the apparatus forms a cavity therein which is suitable as a gas collection and control chamber.

11 Claims, 4 Drawing Sheets

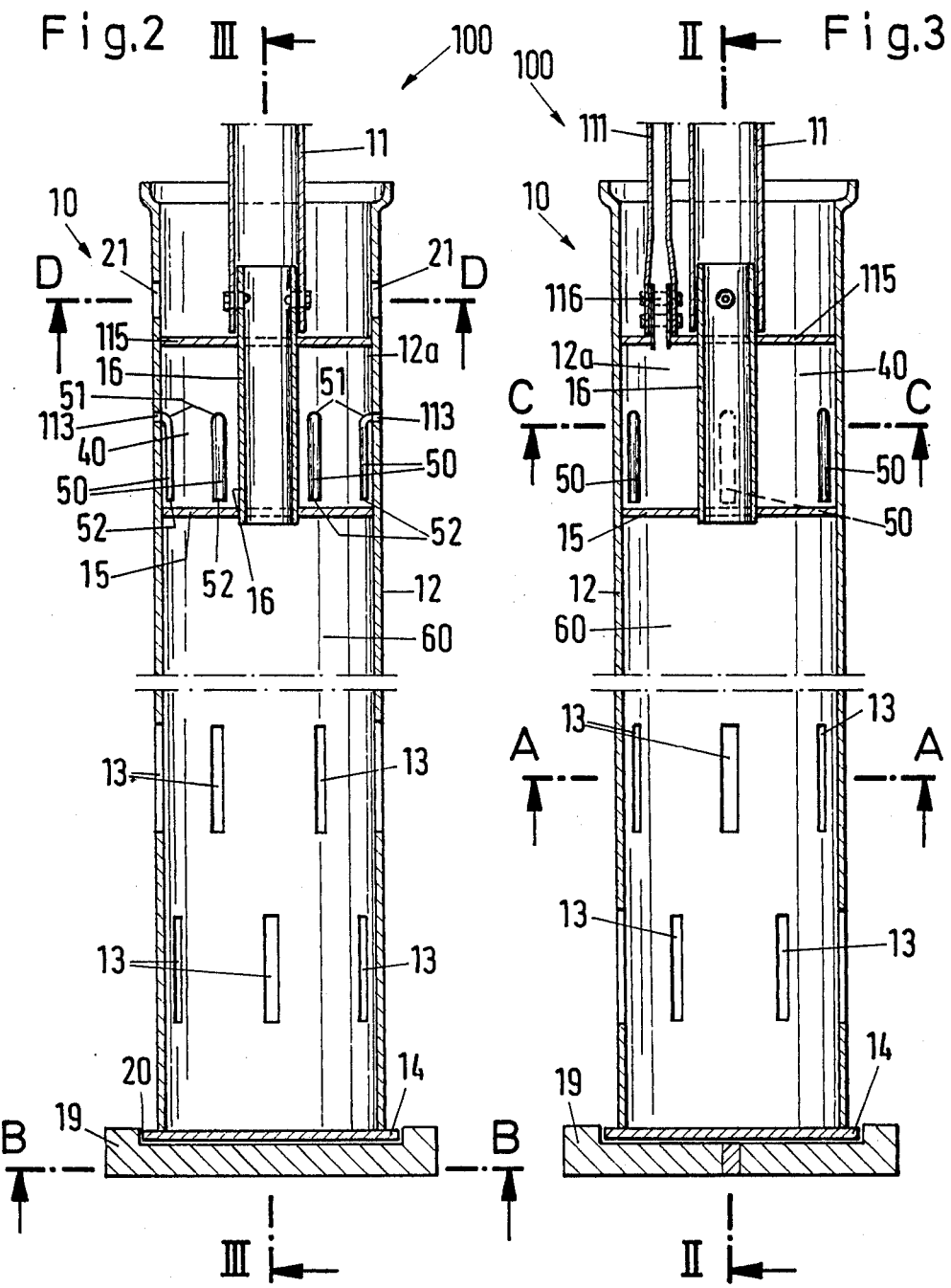

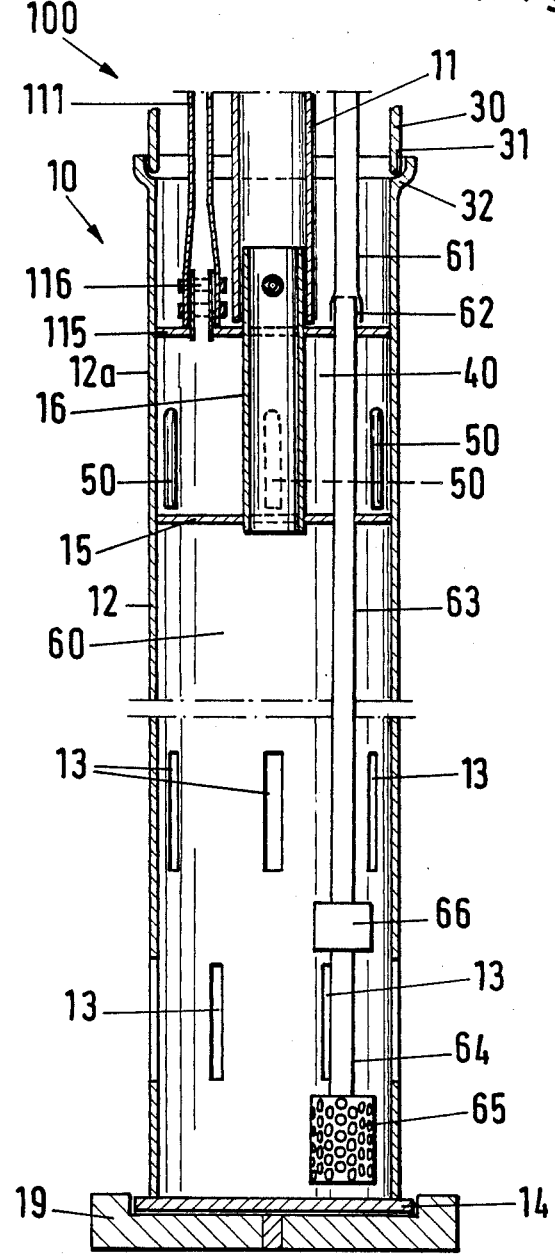

4,946,312

APPARATUS FOR OPENING UP GARBAGE DUMPING GROUND GAS SOURCES AND FOR THE EXPLORATION AND SANIFICATION OF OLD DEPOSIT SITE BURDENS AND CONTAMINATED SOILS

BACKGROUND OF THE INVENTION

The apparatus of the present invention can be employed wherever garbage dumping ground dumps, old deposit or dump site burdens and contaminated soils are to be degasified, purified, sanitized, rehabilitated or checked.

In addition, the present invention relates to an apparatus for opening up garbage dumping ground gas sources and for the exploration and sanitization or rehabilitation of old deposit site burdens and contaminated soils with, by way of example, a hollow cylindrical probe which is insertable into the gassy zone of the dump and which is provided with lateral wall perforations serving as gas inlet apertures, as well as with a gas evacuation duct.

In hitherto known apparatuses of this kind, the probe consisted of a pipe, such as a plastic pipe, which, in the section intended to penetrate into the gassy zone, was provided with wall perforations and which served at the same time as a gas evacuation line. In order to introduce such a probe into the dump, a shaft was first sunk into the latter by means of excavation or by drilling into the dump material, into which the probe was inserted, whereupon the interspaces between the shaft and the probe in the gassy zone were filled with a gaspervious dumped packing of pebbles and, thereabove, with material having a greater density. Sinking the shaft was possible only with a concomitant substantial disturbance of the structure of the dormant dump material. Moreover, clogging of the probes with mud and solids was impossible to eliminate. Further, is was not possible to check the level of water that had infiltrated into the probe, nor could the same be removed by pumping it up.

By means of the present invention it is intended to develop further an apparatus of the type stated in such a way that it can be inserted into the dump material while causing as little disturbance as possible to the dump material and, at the same time, while forming therein a cavity which is suitable to serve as a gas collecting the control chamber. At the same time, the probe is intended to be constructed as a main element of a system for the exploration and sanitization of old deposit or dump site burdens or of contaminated soils.

SUMMARY OF THE INVENTION

In order to solve this technical problem, in an apparatus for opening up gas sources of garbage dumping grounds and for the exploration and sanitization of old deposit site, burdens and of contaminated soils, a hollow cylindrical probe is provided which can be inserted into the gassy zone of the dump and which has casing wall perforations serving as gas inlet apertures as well as a gas evacuation duct. Provision is also made for the apparatus to be fitted with a rigid probe body in the form of a hollow cylindrical steel container that is to be pile-driven into the dump or ground surface, the casing wall of which is provided with the wall perforations and the diameter of which is larger than that of the gas evacuation duct coaxially and detachably connected therewith.

An apparatus as proposed by the present invention can be inserted into the dormant dump material by means of pile-driving, i.e. without any excavation operations. This material is, in places, more or less compressed thereby, it is true; however, this compression is very largely nullified again by the ripping projections and, thereby, its structure in the vicinity of the pile-driving site, is impaired only relatively little. The hollow cylindrical steel container forming the probe body, the casing wall of which is provided with the wall perforations serving as gas inlet apertures, forms with its interior, subsequent to having been pile-driven into the dump, a cavity within the dump which is essentially sealed against the outer atmosphere and and which is suitable on the one hand, as a gas collecting chamber and, on the other, as a control chamber accessible via the gas evacuation duct. The shaft-like space remaining adjacent to the gas evacuation duct following the pile-driving operation is relatively narrow and can be filled with dense soil material, such as clay or the like. The gas evacuation duct, although its diameter is smaller than that of the probe body, can be dimensioned to be so wide that it is possible to introduce through said duct into the control chamber, e.g. a dipstick for measuring the water level, a tool for cleaning possibly clogged gas inlet apertures, or a hosepipe for pumping up mud and water. If the need were to arise, it would also be possible to insert through the gas evacuation duct an optical monitoring device along the lines of an endoscope or means for promoting the process of gas formation. By means of an apparatus according to the present invention, a particularly economical opening up of garbage dumping ground gas sources is possible which restricts gas losses to an absolute minimum and which, in the process, also protects the environment as much as possible. According to a further embodiment, it is provided that above the cover plate, a further cover plate is disposed, between which cover plates a working chamber is located. By the injection of one or more media promoting the formation of gas into the working chamber, it is possible to supply such media to the dump material surrounding the probe and to thus inoculate the dump material in order to trigger, to promote, and/or to control the gas formation process. On the one hand, it is possible with this to increase the gas yield at the beginning of the opening-up operation, while, on the other hand a more uniform gas yield is obtained in the long run, which still results in a gas output even at a time when, normally, the untreated dump material only renders possible a low gas yield.

According to another advantageous further development of the invention, provision is made for the hollow cylindrical steel container to be equipped with a water outlet pipe, it being possible in this case to make provision for the cover plate to be fitted with a pipe socket for the connection of the water outlet pipe, with the pipe socket forming the upper free end of a standpipe passed through the cover plate, and through the further cover plate as well, and extending as far as into the area of the lower base plate, the end of the standpipe on the base plate side being provided with a filter. This construction of the probe makes it possible to employ the same simultaneously as a degasification and drainage probe for the sanification of dumps, old deposit site burdens and contaminated soils. At the same time, the probe is equipped with appropriate means, such as a measuring and control system according to the German DE-PS No. 28 10 687. In addition, it is also possible to provide systems for the supply and discharge or for the circulation control of liquid or gaseous treatment substances on an organic, inorganic or microbiological basis.

Particularly, the circulation control of treatment and/or purification substances renders possible a safe sanitization or rehabilitation of soils and areas to be treated.

Possibilities relating to an advantageous further development of an apparatus according to the invention are indicated in the claims.

BRIEF DESCRIPTION OF THE DRAWINGS

In the drawings, embodiments of the invention are depicted, of which

FIG. 2 shows a probe body in a vertically sectioned view in the direction of Line II—II in FIG. 3, FIG. 3 shows the probe body in a vertically sectioned view in the direction of Line III—III in FIG. 2, FIG. 8 shows a further embodiment of the probe body in a vertically sectioned view.

DETAILED DESCRIPTION OF THE PREFERRED EMBODIMENT

Figure 1:
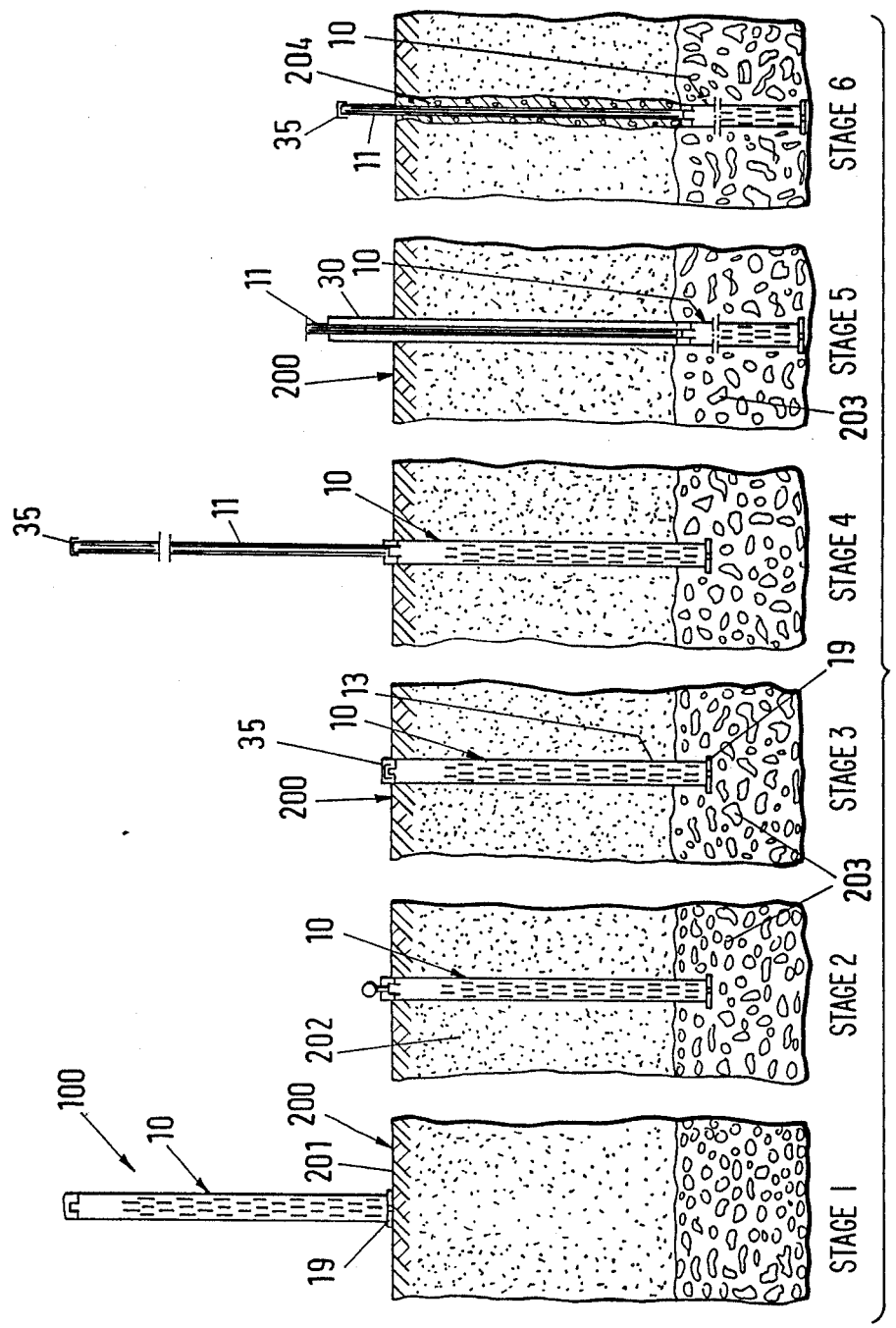
FIG. 1 shows the insertion of a probe body into the gassy zone of a garbage dump.
Figure 4:
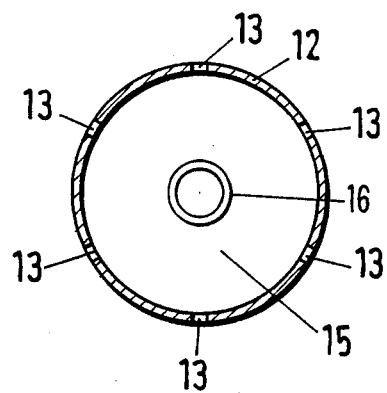
FIG. 4 shows the probe body in a horizontal section in the direction of Line A—A in FIG. 3.

In FIG. 1, the apparatus identified by 100 is depicted in the different stages 1–6. In Stage 1, the steel container 10 with the ripping projections 19 arranged thereon stands on the surface 201 of the garbage dump or dumping ground 200. In Stage 2, the steel container 10 is then, by being pile-driven, passed through the topsoil 202 of the dump as far as into the area of the potentially gassy layers 203.

In Stage 3, gas will then be able to enter from the layer 203 via the perforations 13 into the steel container 10. In addition, the steel container 10 is protected against an inadvertent leakage of the accumulated gas by the cover plate 35. If it proves impossible to collect any gas in Stage 3, or if it can be inferred from other circumstances and/or observations that gas output is not possible or cannot be expected, the steel container 10 can, by means of a drawing device not shown in the drawing, be removed again from the dump 200. In this case, the ripping projections 19, which are not rigidly connected with the steel container 10, remain behind in the material of the dump 200.

In Stage 4, the steel container 10 is connected with the gas evacuation duct 11 which can likewise be sealed with the cover plate 35. For a deeper penetration of the steel container 10 into the gassy material 203 of the dump 200, a driving pipe 30 is mounted on the steel container 10, and the steel container 10 is inserted approximately completely by means of the driving pipe 30 into the layer 203. When the driving pipe 30 is removed, an opening between the layer 203 and the surface is established for a short time, it is true, but the cavity remaining around the gas evacuation duct 11 is backfilled with suitable material 204, so that what loss occurs is negligible, and the anaerobic gas formation process within the layer 203 is not interfered with (Stage 6). This gas formation process can then be controlled and regenerated by the infiltration of a suitable medium. Moreover, with the aid of the gas evacuation duct, an access to the steel container 10 is provided, via which e.g. seeped-in water and/or contaminations can be removed.

Figure 5:
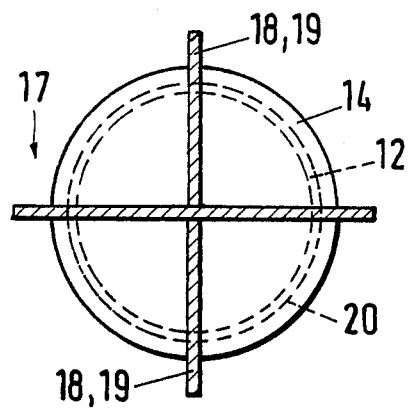
FIG. 5 shows the probe body in a horizontal section in the direction of Line B—B in FIG. 2.

In the FIGS. 2–7, the construction of the apparatus 100 is depicted in detail, the basic body of which is formed by the steel container 10. This is constructed in a hollow cylindrical fashion, and through its casing wall 12 at points beneath the cover plate 15 disposed in its upper end, it is provided with wall perforations 13 which serve as gas inlet apertures. At its lower end, the steel container 10 is sealed by means of a base plate 14 welded thereto. Radially projecting over the casing wall 12 and base plate 14 are concentric guide means made up of ripping projections 19 which consist of a radial arrangement 17 of flat steel bars 18 (FIG. 5).

Figure 6:
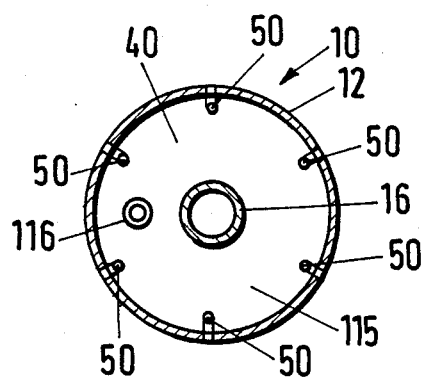
FIG. 6 shows the probe body in a horizontal section in the direction of Line C—C in FIG. 3.

Within the area 12a above the cover plate 15, inside the steel container 10, a further cover plate 115 is disposed, the working chamber 40 being located between the cover plates 15, 115. Within the area of the working chamber 40, the casing wall 12 is provided with perforations 113, and on the inside of wall 12 pipes 50 are arranged, with an L-shaped configuration and having one of their ends 51 sealed to the perforations 113. The lower ends 52 of the pipes 50 extend as far as into the area of the cover plate 15. A fluid, e.g. compressed air, medium can be introduced into the working chamber 40 via a compressed air pipe 111 and a pipe socket 116 (FIG. 3), and this fluid medium can be brought, via the pipes 50, into the space surrounding the casing surface 12 of the steel container 10 (FIG. 6).

Figure 7:
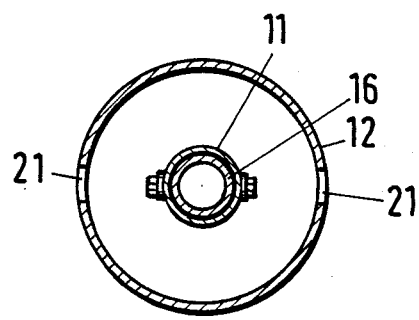
FIG. 7 shows the probe body in a horizontal section in the direction of Line D—D in FIG. 2.

When gas now accumulates in the interior 60 of the steel container 10, this arrives, either due to its own buoyancy or by means of exhaustion, in a pipe socket 16, of for example a flexurally stiff plastic, and closed by cover plate 35, on which the gas evacuation pipe 11 is rigidly disposed, overlapping the same as shown in FIGS. 3 and 7.

With reference to FIGS. 2 and 7, holes 21 permit engagement of a drawing device for removal of steel container 10 from dumping ground 200. Cover plate 115 is beneath hole 21.

In FIG. 8, a further embodiment of the probe is illustrated. In its construction it corresponds to the construction of the probe described in the foregoing, so that sa detailed description can be dispensed with here. However, in this probe, a water outlet pipe 61 is additionally provided for evacuating liquids such as water or the like from the interior 60 of the probe 100. The water outlet pipe is fixedly mounted on a pipe socket 62 overlapping the pipe, which forms the upper free end of a standpipe 63 passed through the interior 60 of the probe 100. At its bottom end 64, the standpipe 63 is provided with an appropriate filter 65 which renders possible extraction of liquids even if material has accumulated within the interior 60 of the probe 100. For the extraction or pumping-out operation, a pump 66, such as a submersible pump, etc., may be arranged in the standpipe 63.

The apparatus is not restricted to the embodiments described and claimed in the foregoing. Thus, another geometrical configuration of the probe body comes within the scope of the invention just like another design of the supply and waste disposal means of the probe. It is possible in particular to equip the probe with measuring and control systems as well as with systems for the supply and the removal or for the circulation control of liquid or gaseous treatment substances on an organic, inorganic or microbiological basis.

FIG. 8 also illustrates concentric guides 31, 32 between the upper end of steel container 10 and driving pipe 30, with a configuration such that driving pipe 30, when being pile-driven into the garbage dumping ground, is frictionally connected with steel container 10, but when being pulled out, detaches itself from the container.

What is claimed is:

1. Apparatus for evacuating gases from garbage dumps and the like, said apparatus comprising:
    a rigid cylindrical body member having an outer cylindrical wall with perforations therethrough for passage of gas, having a bottom plate closing one end of said body member, and having a first cover plate closing the other end of said body member, said body member adapted to be driven into the ground, said body member having a plurality of holes therethrough above said first cover plate and adapted to permit engagement of a drawing device to said body member to remove said body member from the ground;
    a gas evacuation duct detachably connected to said first cover plate and axially extending from said other end of said body member, with a diameter less than the diameter of said body member; and
    a drive pipe coupled to and extending from said body member other end to permit said body member to be driven into the ground to a depth greater than the length of said body member, said drive pipe having a diameter substantially equal to the diameter of said body member, said other end of said body member including concentric guiding means cooperating with one end of said drive pipe of frictionally connect said drive pipe to said body member during driving of said body member into the ground, while permitting separation of said drive pipe from said body member upon pulling of said drive pipe from the ground.

2. Apparatus according to claim 1 further comprising a concentric pipe socket passing through said first cover plate for connection of the gas evacuation duct.

3. Apparatus according to claim 2, wherein said gas evacuation duct and said pipe socket are formed of a flexurally stiff plastic, the upper end of the pipe socket being adapted to be closed by a second cover plate, essentially preventing the leakage of gas from within said body member.

4. Apparatus according to claims 1 or 2, further comprising a radial arrangement of flat steel bars connected to said bottom plate and forming ripping projections during driving of said body member into the ground.

5. Apparatus according to claim 1 further comprising a further cover plate within said body member and disposed underneath the holes, said further cover plate spaced from the first cover plate to delimit a working chamber within said body member, said pipe socket passes through said further cover plate, said body member having further perforations therethrough within the working chamber said apparatus further comprising:
    a plurality of pipe members of L-shaped configuration, each pipe member having a first end coupled to one of the further perforations and a second end directed downwardly and adjacent the first cover plate;
    a pipe socket passing through said further cover plate and adapted for connection of a compressed air line thereto.

6. Apparatus according to claims 3 or 5 further comprising a water outlet pipe passing through each cover plate and into the cylindrical body member.

7. Apparatus according to claim 6 further comprising filtering means within said water outlet pipe.

8. Apparatus according to claim 7, further comprising pumping means coupled to said water outlet pipe for pumping water from the interior of said body member.

9. Apparatus according to claims 1 or 2 further comprising a water outlet pipe passing through the cover plate and into the cylindrical body member.

10. Apparatus according to claim 9 further comprising filtering means within said water outlet pipe.

11. Apparatus according to claim 10 further comprising pumpsing means coupled to said water outlet pipe for pumping water from the interior of said body member.

* * * * *